United States Patent
Komiya

(10) Patent No.: US 8,765,307 B2
(45) Date of Patent: Jul. 1, 2014

(54) STACKED NONAQUEOUS ELECTROLYTE BATTERY, MANUFACTURING METHOD THEREOF AND STACKING APPARATUS THEREFOR

(75) Inventor: Takashi Komiya, Fukushima (JP)

(73) Assignee: Sony Corporation, Tokyo (JP)

( * ) Notice: Subject to any disclaimer, the term of this patent is extended or adjusted under 35 U.S.C. 154(b) by 317 days.

(21) Appl. No.: 12/016,753

(22) Filed: Jan. 18, 2008

(65) Prior Publication Data

US 2008/0305398 A1 Dec. 11, 2008

(30) Foreign Application Priority Data

Feb. 19, 2007 (JP) ................. 2007-037974

(51) Int. Cl.
*H01M 2/16* (2006.01)

(52) U.S. Cl.
USPC ........... 429/246; 429/247; 429/163; 429/171; 429/507

(58) Field of Classification Search
USPC .................. 429/129, 132, 246, 247
See application file for complete search history.

(56) References Cited

U.S. PATENT DOCUMENTS

| | | | |
|---|---|---|---|
| 4,168,772 A * | 9/1979 | Eberle ...................... | 198/418.3 |
| 2005/0271933 A1 * | 12/2005 | Matsumoto et al. .......... | 429/127 |
| 2006/0046137 A1 * | 3/2006 | Kodama ...................... | 429/129 |
| 2006/0240328 A1 * | 10/2006 | Takami et al. ................. | 429/329 |
| 2006/0281004 A1 * | 12/2006 | Yata et al. ..................... | 429/162 |
| 2007/0154790 A1 * | 7/2007 | Jeung et al. .................. | 429/139 |

FOREIGN PATENT DOCUMENTS

| | | | |
|---|---|---|---|
| EP | 0854529 | | 7/1998 |
| JP | 05-074443 | | 3/1993 |
| JP | 10-172565 | | 6/1998 |
| JP | 2000-277062 | | 10/2000 |
| JP | 2001-357882 | | 12/2001 |
| JP | 2003-242955 | | 8/2003 |
| JP | 2004063354 A | * | 2/2004 |
| JP | 2007-317638 | | 12/2007 |
| KR | 2006092429 A | * | 8/2006 |

* cited by examiner

*Primary Examiner* — Melissa Stalder
(74) *Attorney, Agent, or Firm* — K&L Gates LLP

(57) ABSTRACT

A stacked nonaqueous electrolyte battery, a method of manufacturing the battery, and a stacking apparatus for the battery are provided. The stacked nonaqueous electrolyte battery includes a plurality of electrode bodies alternately stacked, each of the electrode bodies including an anode and a cathode laminated through a separator. The separator has a raised edge portion leading along an edge portion of one of the anode and the cathode, and the raised edge portions of the plurality of the separators overlap one another.

9 Claims, 12 Drawing Sheets

FIG. 8A
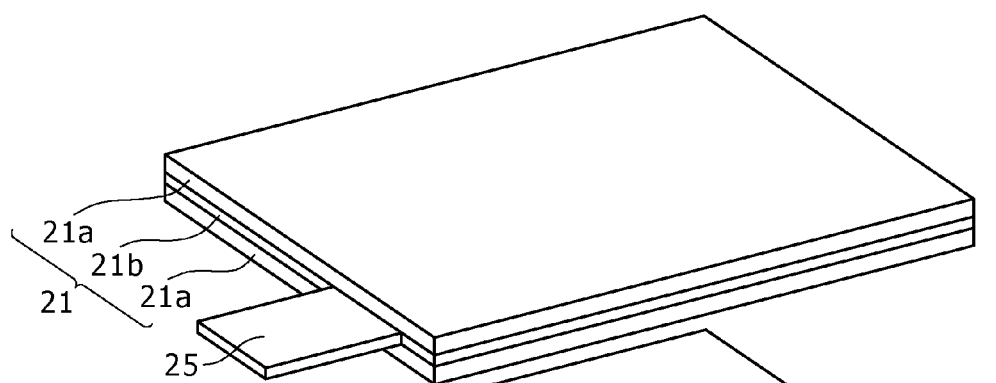
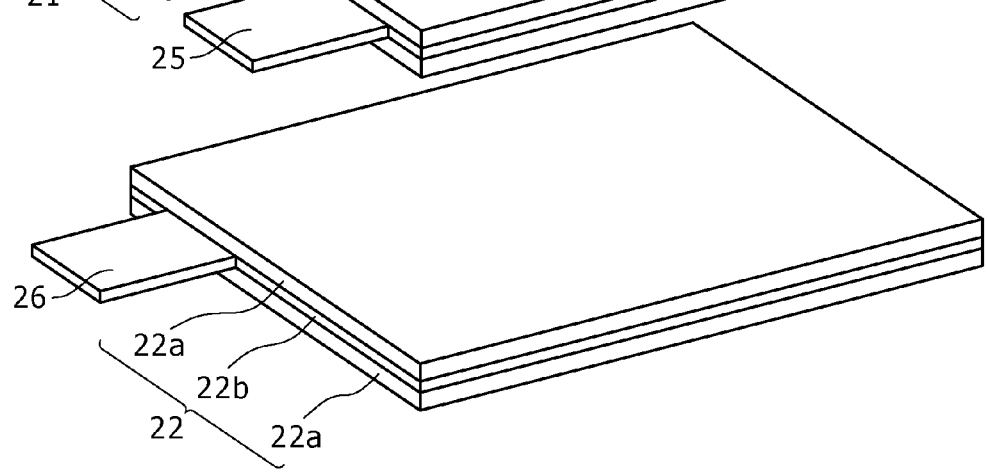
FIG. 8B

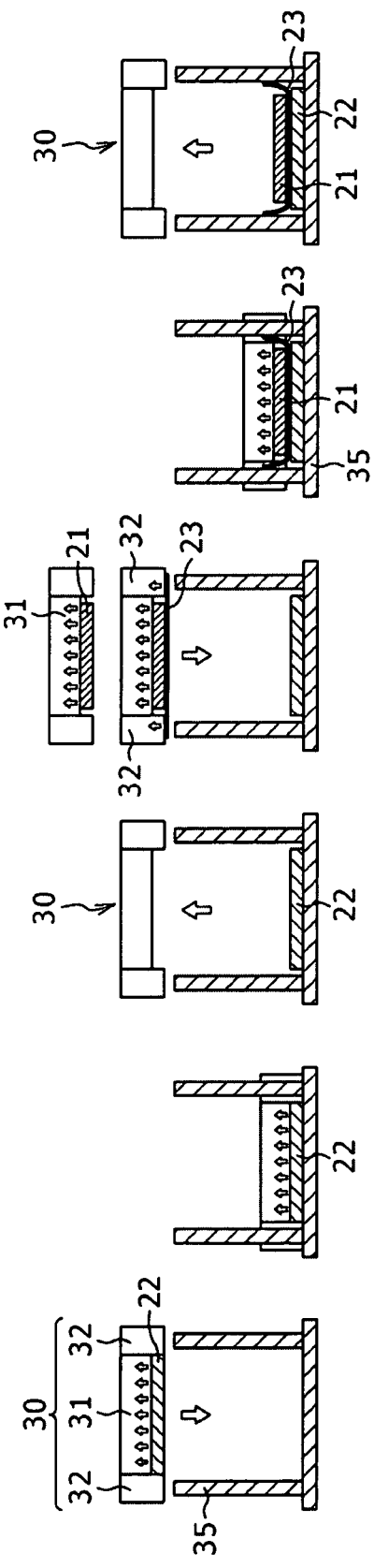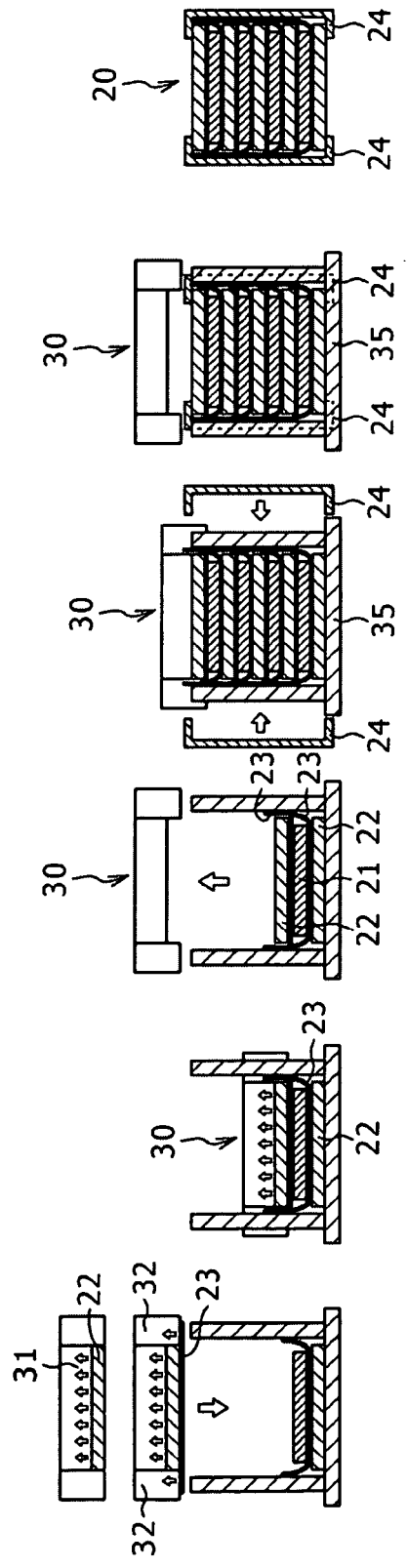

STACKED NONAQUEOUS ELECTROLYTE BATTERY, MANUFACTURING METHOD THEREOF AND STACKING APPARATUS THEREFOR

CROSS REFERENCES TO RELATED APPLICATIONS

The present application claims benefit of priority of Japanese patent Application No. 2007-37974 filed in the Japanese Patent Office on Feb. 19, 2007, the entire contents of which is being incorporated herein by reference.

BACKGROUND

The present application relates to a stacked nonaqueous electrolyte battery, a manufacturing method thereof, and a staking apparatus. More particularly, the application relates to a stacked nonaqueous electrolyte battery whose battery quality and performance are enhanced by preventing electrodes from deviating from their proper positions in stacking the electrodes, and a manufacturing method thereof and a stacking apparatus therefor.

As electronic equipment, such as cellular phones and notebook personal computers, goes further cordless and portable in recent years, thickness-, size-, and weight-reduced portable electronic apparatuses have been developed one after another. Furthermore, their power consumption is on the increase due to diversification of types and functions, and this demands batteries with even higher-capacity and in even lighter weight as their energy source. Accordingly, in order to meet this demand, stacked nonaqueous electrolyte batteries, inter alia, various types of lithium ion secondary batteries utilizing the doping/dedoping of lithium ions have been proposed.

In some of these lithium ion secondary batteries, in order to achieve their thickness reduction, a stacked type is used in which a plurality of anodes and cathodes are stacked through separators alternately. In such a battery, at a portion where an anode 1 having anode active material layers 1*a* formed on both surfaces of an anode current collector 1*b* is opposed to a cathode 2 having cathode active material layers 2*a* formed on both surfaces of a cathode current collector 2*b* through a separator 3, the cathode 2 is larger than the anode 1, and the separator 3 has a length equal to or larger than the cathode 2 as shown in FIG. 1A. In this structure, lithium ions pass through the separator 3 to charge and discharge the battery normally.

However, when the anode 1 is larger than the separator 3 and thus opposed to the cathode 2 as shown in FIG. 1B, a flow of ions not passing through the separator 3 such as shown by dashed lines is produced at a portion where the anode 1 is directly opposed to the cathode 2, addressing issues such as short-circuits and abnormal heat generation in the battery. Furthermore, as shown in FIG. 1C, when the anode 1 is larger than not only the separator 3 but also the cathode 2, lithium 4 is deposited on an edge portion of the cathode 2 and dendrites are formed, so that short-circuits are caused Thus, since deviation in any of the anode 1, the cathode 2, and the separator 3 greatly affects the quality of the battery, it is required to prevent the anode 1 and the cathode 2 from being directly opposed to each other due to deviation in internal components of the battery when shock is applied to the battery during or after its manufacturing.

Accordingly, a sealed type sheet-shaped lithium battery such as disclosed in Japanese Unexamined Patent Application Publication No. 10-172565 (hereinafter referred to as "Patent Document 1") has been proposed. In this battery, at least one of an anode and a cathode is housed in a bag-shaped separator in which edge portions are welded, and stacked such as shown in FIG. 2. It is noted in FIG. 2 that a plurality of anodes 1 and cathodes 2 are stacked and shown by omitting a packaging material of the battery.

Furthermore, in addition to the battery having a structure such as disclosed in Patent Document 1, there have been proposed, e.g., a battery having a spirally wound stacked longitudinal sectional structure in which stacked electrode bodies 4 each having an anode 1 and a cathode 2 laminated through a separator 3 are stacked while spirally wound by another sheet of separator 3 such as shown in FIG. 3, and a battery having a folded longitudinal sectional structure in which an anode 1 and a cathode 2 are inserted alternately into spaces of a zigzag-folded separator 3 such as shown in FIG. 4.

However, in the battery disclosed in Patent Document 1 in which at least one of the anode and the cathode is housed in the bag-shaped separator, an expensive sealing apparatus with high positioning accuracy is required in order to ensure a small welding margin of, e.g., about 3 mm to 4 mm at each edge portion of the separator, thereby increasing manufacturing costs. In addition, the electrodes may not be formed larger in size due to the welding margins, which limits the enhancement in battery capacity.

Furthermore, in the above-mentioned battery having the spirally wound stacked or the folded longitudinal sectional structure, each electrode is inserted between separators with some clearance, so that the electrode is held only with contact forces from the vertically adjacent electrodes. This may loosen the hold of the electrode in position and cause the electrode to deviate from its proper position when shock is applied, making it likely to impair the quality of the battery. Furthermore, for these batteries, the separator 3 may be necessary to be folded in a special manner, and this entails expensive equipment.

Furthermore, in a simple configuration in which anodes/cathodes and separators are alternately stacked, respectively, extraneous matter may enter from the interface between a separator and an anode/cathode, making it likely also to block battery reactions to impair the quality and safety of the battery.

SUMMARY

Therefore, it is desirable to provide a stacked nonaqueous electrolyte battery having superior battery quality and performance, as well as a manufacturing method thereof and a stacking apparatus therefor.

In accordance with an embodiment, there is provided a stacked nonaqueous electrolyte battery which includes a plurality of anodes and cathodes alternately stacked and isolated separators. The separators have raised edge portions along an edge portion of one of the anodes and cathodes. The raised edge portions of a plurality of the separators overlap one another.

In accordance with another embodiment, there is provided a method of manufacturing the stacked nonaquous electrolyte battery includes the steps of stacking an anode or cathode and a separator such that an edge portion of the separator is raised, holding a state of the raised edge portion of the separator to fabricate a battery element, and packing the battery element with a packaging material. The stacking step is performed by repeating the following the steps a plurality of times, sucking the anode or cathode, sucking the separator while maintaining the suction of the anode or the cathode, inserting both the anode or cathode and the separator into a contour holding member such that the edge portion of the separator is raised, and mounting the anode or cathode and the separator together by releasing the suction of both the anode or cathode and the separator.

In accordance with further embodiment, there is provided a stacking apparatus for stacking anodes, cathodes, and separators, which includes a sucking apparatus and a contour holding member. The sucking apparatus includes an electrode sucking member, provided with a first vacuuming mechanism, for sucking at least a peripheral portion of the anodes or cathodes by the first vacuuming mechanism, a separator sucking member, provided with a second vacuuming mechanism, for sucking a peripheral portion of the separators by the second vacuuming mechanism, and a moving member for lowering and elevating the electrode sucking member and the separator sucking member together. The contour holding member holds a contour of the anode, the cathode, and the separator, by raising an edge portion of the separator during the stacking of the anode, the cathode, and the separator.

Additional features and advantages are described herein, and will be apparent from, the following Detailed Description and the figures.

BRIEF DESCRIPTION OF THE FIGURES

FIGS. 8A and 8B are schematic diagrams showing the construction of an anode and a cathode of the battery element according to an embodiment;

FIGS. 12A through 12L are schematic diagrams showing a lamination process for the electrodes and the separators;

DETAILED DESCRIPTION

Embodiments of the present application will now be described with reference to the accompanying drawings.

(1) Construction of Stacked Nonaqueous Electrolyte Battery

Figure 1A:
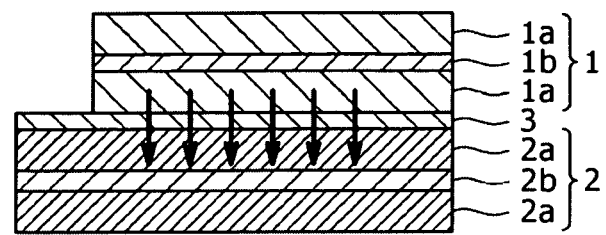
FIGS. 1A, 1B, and 1C are schematic diagrams for illustrating ways in which an anode, a cathode, and a separator are arranged.
Figure 1B:
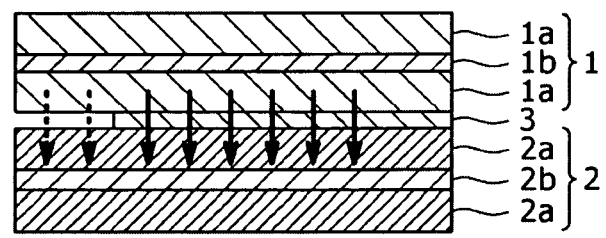
Figure 1C:
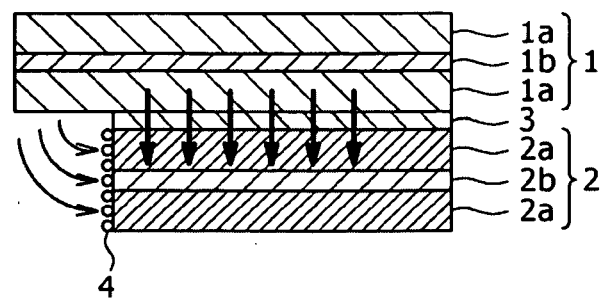
Figure 2:
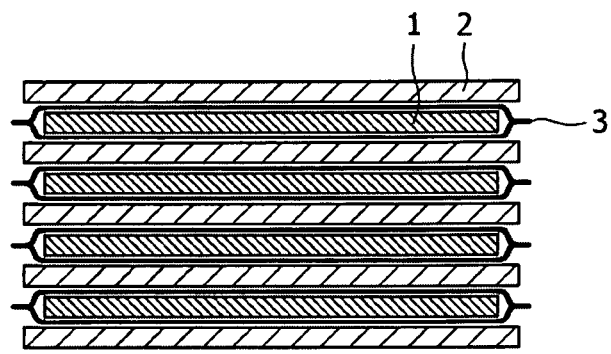
FIG. 2 is a sectional view showing a construction example of a known stacked nonaqueous electrolyte battery.
Figure 3:
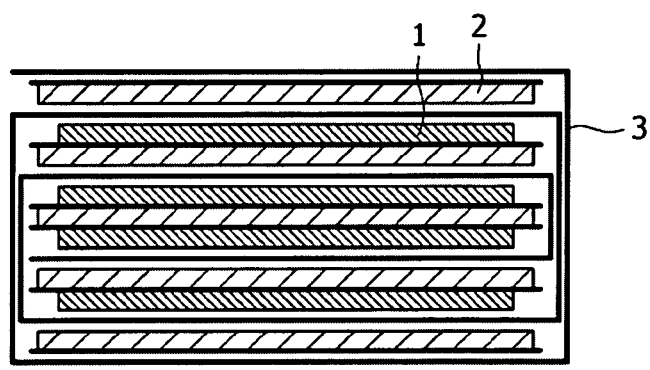
FIG. 3 is a sectional view showing a construction example of a known stacked nonaqueous electrolyte battery.
Figure 4:
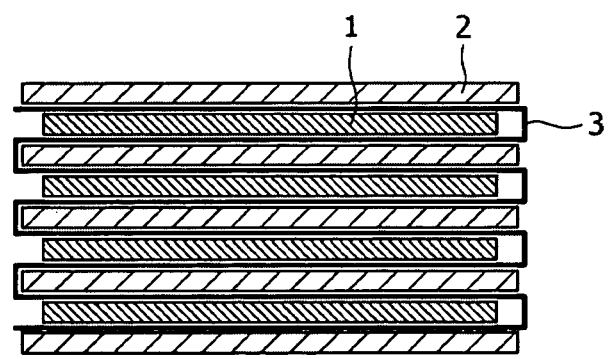
FIG. 4 is a sectional view showing a construction example of a known stacked nonaqueous electrolyte battery.
Figure 5A:
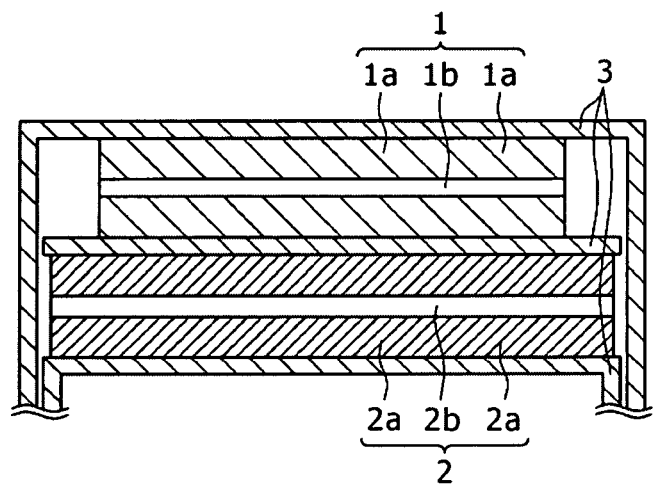
FIGS. 5A and 5B are schematic diagrams showing in detail the constructions of the stacked nonaqueous electrolyte batteries shown in FIGS. 3 and 4.
Figure 5B:
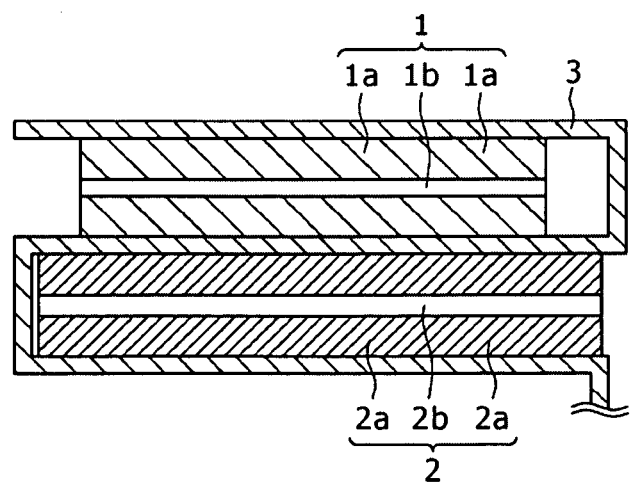
Figure 6A:
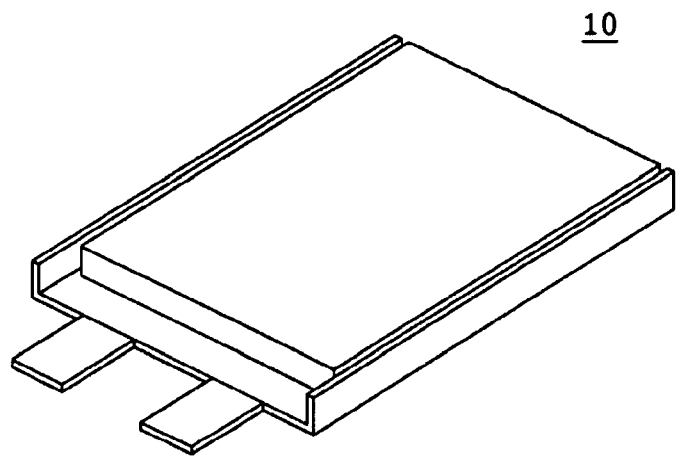
FIGS. 6A and 6B are schematic diagrams showing a construction example of a stacked nonaqueous electrolyte battery according to an embodiment.
Figure 6B:
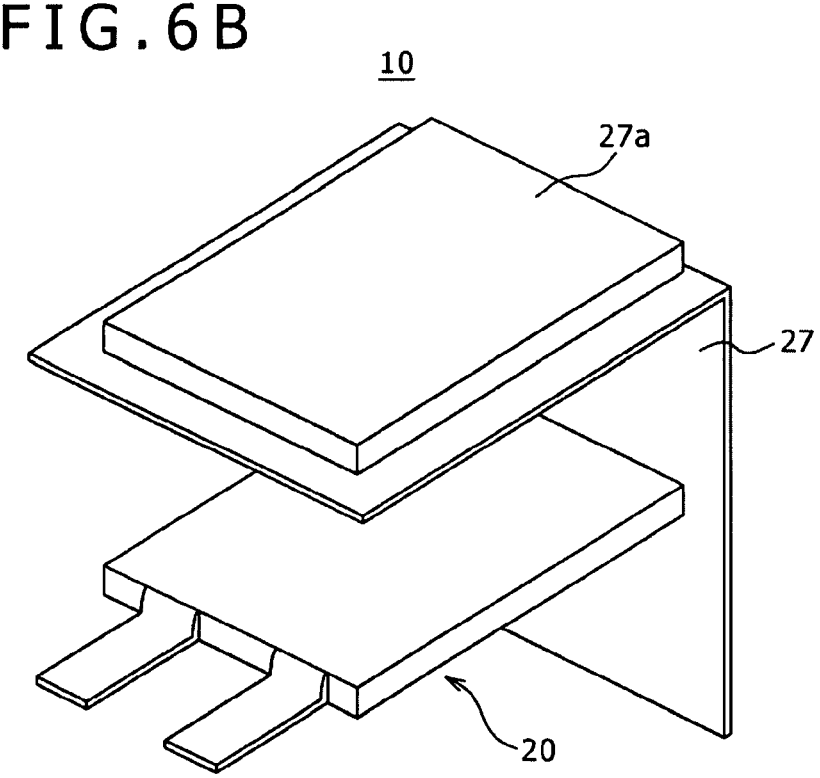
Figure 7A:
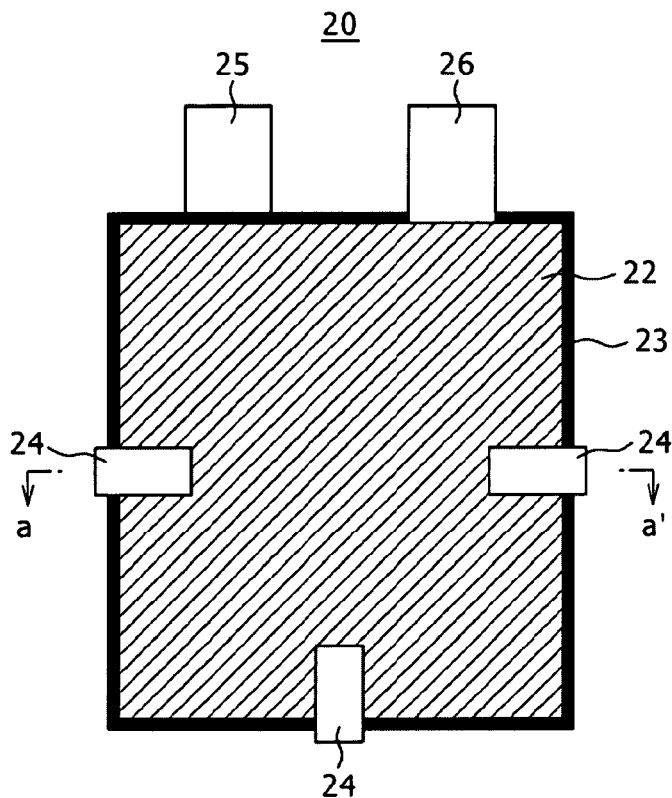
FIGS. 7A and 7B are schematic diagrams showing the construction of a battery element according to an embodiment.

FIG. 6A shows the appearance of a stacked nonaqueous electrolyte battery 10 according to an embodiment, and FIG. 6B shows a construction example of the stacked nonaqueous electrolyte battery 10. Also, FIG. 7A shows a top view of a battery element 20 housed in the stacked nonaqueous electrolyte battery 10, and FIG. 7B shows a sectional view taken along a line a-a' of the battery element 20.

As shown in FIGS. 6A and 6B, the stacked nonaqueous electrolyte battery 10 is fabricated by housing the battery element 20 in a moisture-resistant laminate film 27 which is a packaging material, injecting an electrolytic solution (not shown) and then sealing edge portions of the laminate film 27 surrounding the battery element 20 together by welding. The battery element 20 has an anode terminal 25 and a cathode terminal 26, and these electrode terminals are extended outer from the battery element 20 as leads while sandwiched between the corresponding edge portions of the laminate film 27. Each of the anode terminal 25 and the cathode terminal 26 may have both of the surfaces sheathed with resin strips in order to improve, e.g., the adhesion to the laminate film 27. For such resin strips, a material is used that has good adhesion with a metal of which the electrode terminals are made, such as, e.g., an acid-modified polyethylene material.

Figure 7B:
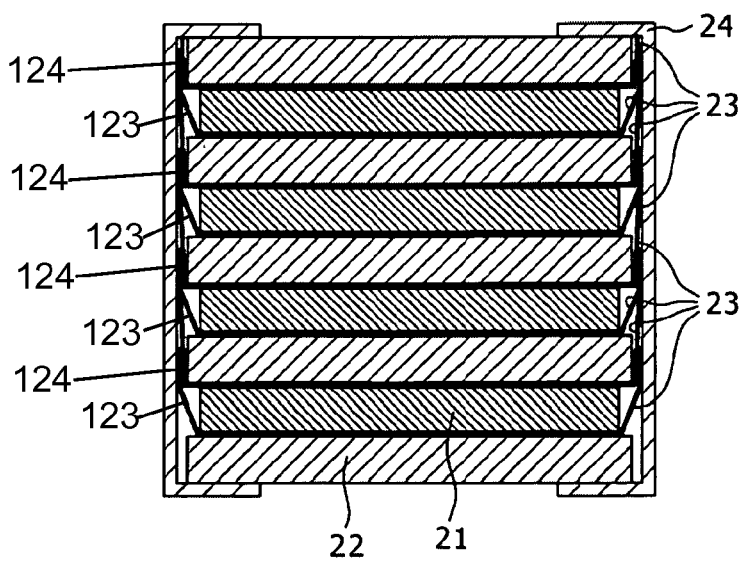

The battery element 20 housed in the stacked nonaqueous electrolyte battery 10 is constructed, as shown, e.g., in FIG. 7B, by stacking a plurality of anodes 21 and cathodes 22 through separators 23, and by fixing a stacked resultant with an adhesive tape 24 which is a fixing member. An edge portion of each of the separators 23 is raised, and the adhesive tape 24 is disposed such that a plurality of separators 23, preferably two separators 23, overlap each other along an edge portion of one electrode sheet. The adhesive tape 24 is disposed at, for example, three sides which are electrode side portions excluding a leading side from which the electrode terminals are lead, and an electrode bottom portion opposite to the leading side of electrode.

[Packaging Material]

The laminate film 27 has, e.g., a laminated structure in which an adhesive layer, a metal layer, and a surface protection layer are laminated successively. The adhesive layer is formed from a polymer film that is welded by heat or ultrasonic wave with another sheet, and the polymer film is formed from, e.g., polypropylene (PP), polyethylene (PE), casted polypropylene (CPP), linear low-density polyethylene (LLDPE), and low-density polyethylene (LDPE). The metal layer is made of a metal foil and act as major role in preventing from the entry of moisture, oxygen, and light, to protect the contents. The metal foil may be made from, e.g., aluminum (Al) for its lightness, extensibility, low price, good processability, and the like. In addition to aluminum, other metals may also be used as the metal foil. The surface protection layer is made from, e.g., nylon (Ny) or polyethylene terephthalate (PET) because of their good appearance, toughness, flexibility, and the like. The surface on the side of the adhesive layer is a housing surface for housing the battery element 20 thereon.

The laminate film 27 thus formed has a container portion 27a which is hollowed toward the surface protection layer side from the adhesive layer side. By housing the battery element 20 in this container portion 27a, the sealability of the battery element 20 can be enhanced. The container portion 27a is formed by deep-drawing or the like.

[Nonaqueous Electrolytic Solution]

As a nonaqueous electrolytic solution, any electrolytic salt and organic solvent commonly used for nonaqueous electrolyte batteries may be used.

Nonaqueous solvents include, specifically, ethylenecarbonate (EC), propylenecarbonate (PC), γ-butyrolactone, dimethylcarbonate (DMC), diethylcarbonate (DEC), ethylmethylcarbonate (EMC), dipropylcarbonate (DPC), ethylpropylcarbonate (EPC), and solvents obtained by substituting hydrogen atoms of these carbonates with halogen atoms. These solvents may be used alone or in combination in a predetermined composition.

Furthermore, any electrolytic salt typically used for nonaqueous electrolytic solutions may be used. Specifically, it may include LiCl, LiBr, LiI, $LiClO_3$, $LiClO_4$, $LiBF_4$, $LiPF_6$, $LiNO_3$, $LiN(CF_3SO_2)_2$, $LiN(C_2F_5SO_2)_2$, $LiAsF_6$, $LiCF_3SO_3$, $LiC(SO_2CF_3)_3$, $LiAlCl_4$, and $LiSiF_6$. However, from the viewpoint of oxidation stability, $LiPF_6$ and $LiBF_4$ are preferable. These lithium salts may be used alone or in combination. Although the lithium salt could be dissolved at any concentration without problem as long as it can be dissolved into any of the above solvents, it is preferable that concentrations of lithium ions range from 0.4 mol/kg to 2.0 mol/kg with respect to a nonaqueous solvent.

[Battery Element]

The battery element 20 will be described below in detail.

[Anode]

The anode 21 includes, as shown in FIG. 8, an anode current collector 21b and anode active material layers 21b formed on both surfaces of this anode current collector 21b. The anode current collector 21b is made of a metal foil such as, e.g., an Al foil. Furthermore, the anode terminal 25, formed unitary with the anode current collector 21b, leads from one side of the anode 21 as a lead.

The anode active material layers 21a are formed by containing, e.g., an anode active material, a conductive agent, and a binding agent.

As the anode active material, metal oxides, metal sulfides, or specific polymers may be used according to the intended type of battery. For example, for a lithium ion battery, lithium-transition metal composite oxides mainly formed from $Li_xMO_2$ (where M denotes one or more transition metals, and x varies depending on the charged/discharged conditions of the battery and normally ranges from 0.05 to 1.10) are used. The transition metal(s) from which the lithium composite oxides are made includes cobalt (Co), nickel (Ni), and/or manganese (Mn).

Among such lithium composite oxides are, specifically, $LiCoO_2$, $LiNiO_2$, $LiMn_2O_4$, $LiNi_yCo_{1-y}O_2$ (0<y<1), and the like. In addition, solid solutions each obtained by substituting a part of a transition metal element into another element may also be used, among which $LiNi_{0.5}Co_{0.5}O_2$ and $LiNi_{0.8}Co_{0.2}O_2$ are some examples. These lithium composite oxides can generate a high voltage and are superior in energy density. Furthermore, as other anode active materials, metal sulfides or oxides containing no lithium, such as $TiS_2$, $MoS_2$, $NbSe_2$, and $V_2O_5$, may be used. These anode active materials may be used alone or in combination.

Furthermore, the conductive agent includes, e.g., carbon materials, such as carbon blacks and graphites. The binding agent includes, e.g., polyvinylidene fluoride (PVdF), and polytetrafluoroethylene (PTFE).

[Cathode]

The cathode 22 includes a cathode current collector 22b having outer dimensions several millimeters larger than the anode current collector 21b, and cathode active material layers 22a formed on both surfaces of this cathode current collector 22b. The cathode current collector 22b is a metal foil made from, e.g., copper (Cu), nickel (Ni), stainless steel (SUS), or the like. Furthermore, the cathode terminal 26, formed unitary with the cathode current collector 22b, leads from one side of the cathode 22 as a lead, similarly to the anode 21.

The cathode active material layers 22a are formed by containing, e.g., a cathode active material, a conductive agent if necessary, and a binding agent.

The cathode active material includes metallic lithium, lithium alloys, or lithium-dopable/dedopable carbon materials, or composite materials made from metal-containing materials and carbon-containing materials. Specifically, the lithium-dopable/dedopable carbon materials may include graphites, non-graphitizable carbons, and soft carbons. More specifically, carbon materials such as pyrolitic carbons, coke (pitch coke, needle coke, petroleum coke), graphites, glassy carbons, organic polymer-compound baked bodies (obtained by baking phenol resins, furan resins, or the like at an appropriate temperature and carbonizing them), carbon fibers, and activated carbons can be used. Furthermore, lithium-dopable/dedopable materials may include polymers such as polyacethylene and polypyrrole, and oxides such as $SnO_2$.

Furthermore, materials alloyed with lithium include various kinds of metals, among which tin (Sn), cobalt (Co), indium (In), aluminum (Al), silicon (Si), and their alloys may be used. When metallic lithium is used, lithium powder is not necessary to be formed into a coating film using a binding agent, but a method of compression-bonding a rolled lithium metal foil onto a current collector may instead be employed.

Usable binding agents include, e.g., polyvinylidene fluoride (PVdF), styrene-butadiene rubbers (SBR), and the like.

[Separator]

Referring to FIG. 7B, the illustrated raised edge portions of the separators 23 include a first portion 123 extending from the separator 23 at a first angle and a second portion 124 extending from the first portion at a second angle. Both the first and second angles are less than 180 degrees.

The separator 23 is made of a porous film formed from a polyolefin-containing material such as, e.g., polypropylene (PP) or polyethylene (PE), or a porous film formed from an inorganic material such as a ceramic nonwoven fabric, and may also have a structure in which two or more kinds of these porous films are laminated. Of all these films, a porous film formed from polypropylene (PP) or polyethylene (PE) may be effective.

The separator 23 having larger outer dimensions than each of the anode 21 and the cathode 22 is used in order to prevent short-circuits between the anode 21 and the cathode 22. The dimensions of the separator 23 are properly selected according to the dimensions and thicknesses of the anode 21 and the cathode 22 to ensure that edge portions of at least two separator 23 sheets overlap along an edge portion of the electrode when the separator is stacked together with the anode 21 and the cathode 22.

In general, the separator 23 having thicknesses ranging from 5 μm to 50 μm is suitably usable. Its thicknesses ranging from 7 μm to 30 μm may be more preferable. If the separator 23 is too thick, the amount of the active materials filled is reduced to reduce the battery capacity, and the ion conductivity is also reduced to reduce the current characteristics. If, on the contrary, the separator 23 is too thin, the mechanical strength of the film is reduced.

The separator 23 may be formed such that an electrolytic solution gels when the electrolytic solution is charged and the separator 23 is impregnated therewith during a battery fabrication process.

[Fixing Member]

As the adhesive tape 24 for the fixing member that fixes the stacked state of the anodes 21, the cathodes 22, and the separators 23, a tape is used which has an adhesive layer on one surface of a substrate and in which the substrate and the adhesive layer have resistance to the electrolytic solution.

Furthermore, the fixing member is not limited to the adhesive tape 24 formed from a material such as polypropylene (PP), low-density polyethylene (LDPE), high-density polyethylene (HDPE), polyethylene terephthalate (PET), polyethylene naphthalate (PEN), polyphenylene sulfide (PPS), or polyimide (PI), but may include any member as long as it is resistant to the electrolytic solution and can hold the stacked state.

(2) Manufacturing Method for Stacked Nonaqueous Electrolyte Battery

Next, a method of manufacturing the stacked nonaqueous electrolyte battery 10 according to an embodiment will be described. The production method includes the steps of inserting the anode 21 or the cathode 22 and the separator 23 sucked by a sucking apparatus, into the contour holding member that stacks the electrode at a desired position, and releasing suction of both the electrode and the separator 23 together. These steps are repeated several times to stack a plurality of electrodes. First, a stacking apparatus for stacking the anodes 21, the cathodes 22, and the separators 23 will be described.

[Stacking Apparatus]

Figure 9A:
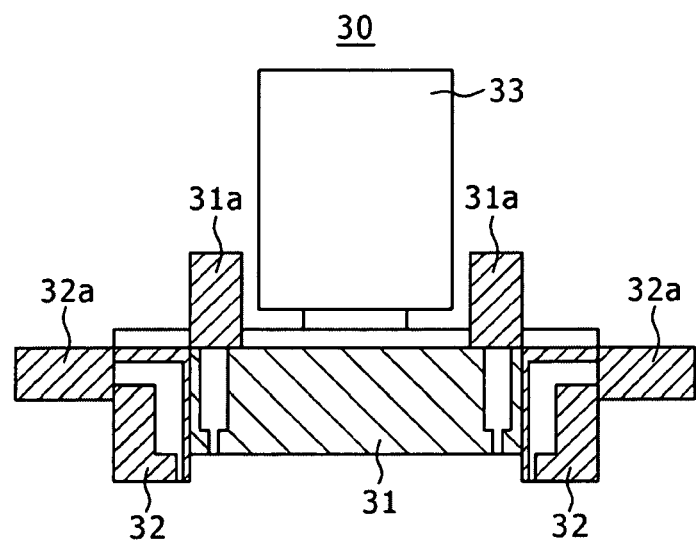
FIGS. 9A and 9B are schematic diagrams showing the construction of a sucking apparatus included in a stacking apparatus for fabricating the stacked nonaqueous electrolyte battery according to an embodiment.
Figure 9B:
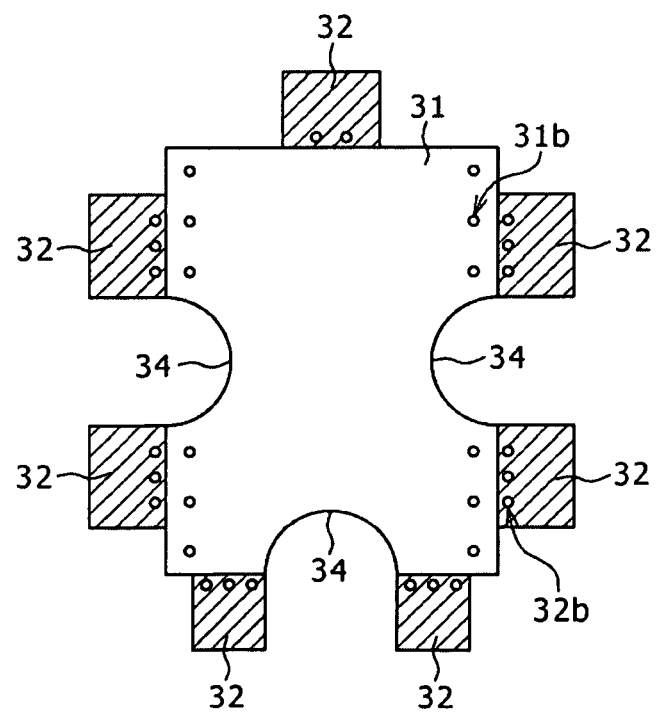

FIG. 9A is a sectional view of a sucking apparatus 30, and FIG. 9B is a bottom view of the sucking apparatus 30.

Figure 10A:
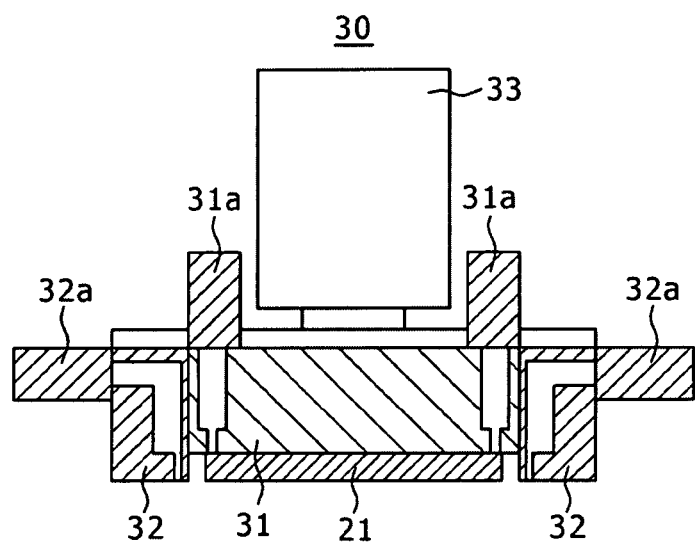
FIGS. 10A and 10B are schematic diagrams showing how the sucking apparatus sucks an electrode and a separator.

The sucking apparatus 30 has an electrode sucking block 31 which is the electrode sucking member for sucking the anode 21 and the cathode 22, a separator sucking block 32 which is the separator sucking member for sucking the separator 23, and an elevating cylinder 33 which is the moving member for moving the electrode sucking block 31 and the separator sucking block 32 up and down. The electrode sucking block 31 has at a bottom surface thereof a plurality of electrode sucking holes 31b for sucking the anode 21 or the cathode 22. The anode 21 or the cathode 22 is sucked while vacuumed by air couplings 31a connected to piping from the electrode sucking holes 31b, as shown in FIG. 10A.

It is noted that the electrode sucking holes 31b are provided at positions inside an area defined by smaller ones of the outer dimensions of either of the anode 21 or the cathode 22. Alternatively, the electrode sucking holes 31b may be provided at a midsection or the like of the electrode sucking block 31 through proper piping arrangement. However, by positioning these holes in a manner sucking at least the peripheral portion of an electrode, the electrode may be sucked reliably.

Furthermore, the electrode sucking block 31 has, e.g., recesses 34. With this structure, even if the electrode sucking block 31 and the electrode are in contact, the recesses 34 expose the electrode, thereby facilitating the subsequent fixing of the electrodes with the adhesive tape 34.

Figure 10B:
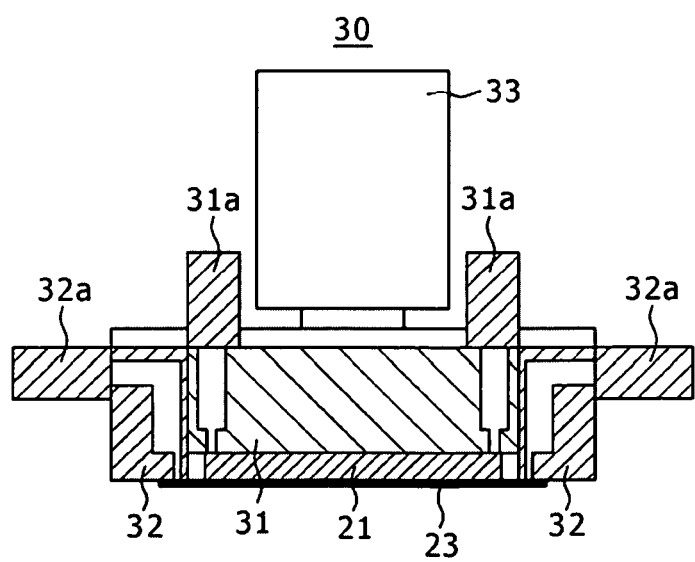

The separator sucking block 32 is disposed in a manner surrounding the electrode sucking block 31, and has at a bottom surface thereof, a plurality of separator sucking holes 32b for sucking the separator 23. The separator sucking holes 32b are provided at an edge portion that is on the electrode sucking block 31 side of the separator sucking block 32, allowing the separator 23 to be sucked while vacuumed by air couplings 32a connected to piping from the separator sucking holes 32b, as shown in FIG. 10B. The separator sucking holes 32b are positioned more toward the electrode sucking block 31 than the separator 23 edge portions.

Figure 11A:
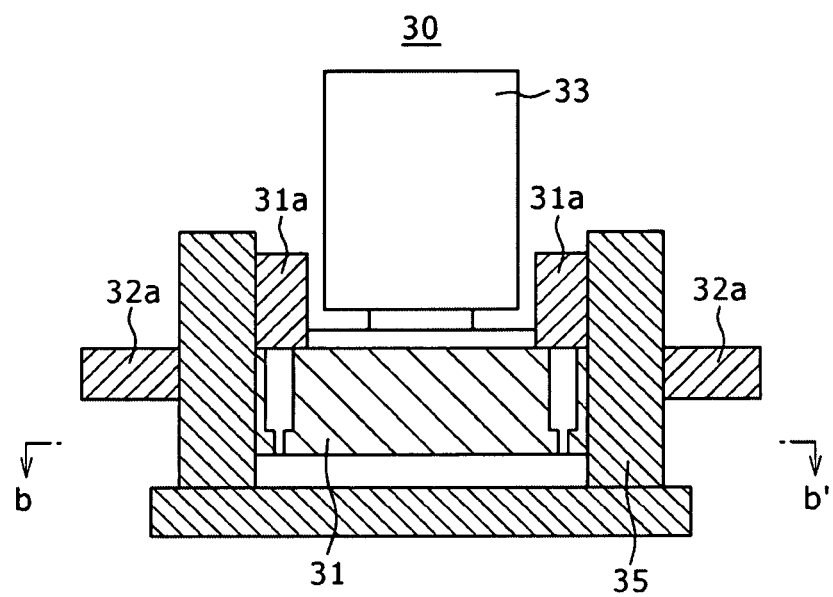
FIGS. 11A and 11B are sectional views showing the arrangement of the sucking apparatus and a contour holder included in the stacking apparatus.
Figure 11B:
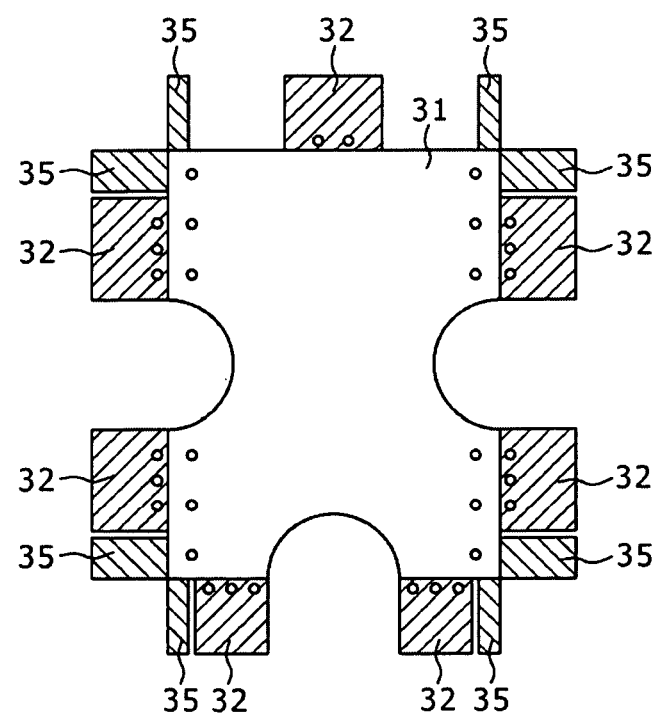

The sucking apparatus 30 thus constructed sucks the electrode and the separator 23, and thereafter inserts the electrode and the separator 23 into a contour holder 35 which is the contour holding member. At this time, as shown in FIGS. 11A and 11B, the sucking apparatus 30 and the contour holder 35 are disposed so as not to interfere with each other. Furthermore, by disposing the separator sucking block 32 and the contour holder 35 off the recesses 34, it is configured such that the adhesion of the adhesive tape 24 is not hindered.

It is noted that, in order to stack the electrode and the separator 23 properly using the sucking apparatus 30 and the contour holder 35 mentioned above, the edge portion positions of the cathode 22 and the separator 23 are considered preferably as follows.

The cathode 22 is sized so as to have a small clearance with respect to the contour holder 35, the clearance being set preferably to not less than 0.1 mm and not more than 0.2 mm with respect to the inside dimensions of the contour holder 35. Any larger clearance of the cathode 22 with respect to the contour holder 35 necessarily increases its clearance with respect to the separator 23 edge portion, making the separator 23 excessively large with respect to the cathode 22. This reduces the volumetric efficiency of the battery. Furthermore, when the clearance becomes too large, there may arise an issue that the separator 23 adjacent to the cathode 22 is hard to rise. In view of this, it is better to minimize the clearance between the cathode 22 and the contour holder 35. However, if the clearance is too small, a space for housing another separator 23 sheet rising from a lower layer is decreased, thereby preventing edge portions of the separators 23 from properly rising.

The clearance between the cathode 22 and the contour holder 35 is preferably not less than 0.1 mm. To allow at least two separator 23 sheets to overlap each other, a common type of separator would require a minimum clearance of 0.1 mm, which is the sum of a thickness equal to two separator 23 sheets and some clearance for their insertion.

Separators with higher functions may allow for even a smaller clearance since the thickness of the separator 23 defines the required clearance. In this case, positioning accuracy is required to be improved during insertion of the cathode 22.

Preferably, the contour holder 35 has outer dimensions smaller by not less than 0.4 mm and not more than 0.6 mm, at one side thereof with respect to the corresponding edge portion of the separator 23; i.e., it is preferable that the contour holder 35 have inside dimensions smaller by not less than 0.8 mm and not more than 1.2 mm than the outer dimensions of the separator 23. The separator 23 is to be larger than the inside dimensions of the contour holder 35 by a thickness equal to at least two separator sheets whose edge portions are raised and overlap each other along an edge portion of the electrode. If the separator 23 becomes too large, the raised edge portions of the separator 23 bend inwards, making insertion difficult when a next electrode and separator group is inserted.

Additionally, the separator sucking holes of the separator sucking block 32 are provided preferably at positions inside the perimeter of the separator 23 by not less than 0.05 mm and not more than 0.25 mm. If it is less than 0.05 mm, it becomes difficult to adjust the position of the separator 23, whereby the separator 23 may not be sucked. If it is above 0.25 mm, an edge portion of the separator 23 may face downward, whereby the edge portion of the separator 23 may not be arisen properly at the time of its insertion into the contour holder 35. Here, the positions of the separator sucking holes 23b are indicated by the distance in a straight line from the separator 23 edge portions to the outer regions of the separator sucking holes 32b.

[Production of Stacked Nonaqueous Electrolyte Battery]

The stacked nonaqueous electrolyte battery 10 is produced by stacking electrodes, using a stacking apparatus such as described above. First, the anode 21 and the cathode 22 are produced.

[Production of Anode]

A metal foil for the material of the anode current collector 21b is punched into a desired shape to form the anode current collector 21b. At this time, the metal foil is punched into the shape such that the anode terminal 25 projects from one side of the anode current collector 21b as one piece, thereby forming the anode current collector 21b and the anode terminal 25 into one unit.

The above-mentioned anode active material, binding agent, and conductive agent are mixed homogeneously into an anode mixture, and this anode mixture is dispersed into a solvent to be made slurry. Then, this slurry is applied evenly over the anode current collector 21b by a doctor blade method or the like, and thereafter dried at a high temperature to remove the solvent. The anode active layers 21a are thus formed. It is noted that N-methyl-2-pyrrolidone (NMP) or the like is used as the solvent. It is acceptable as long as the anode active material, the conductive agent, the binding agent, and the solvent are dispersed homogeneously, irrespective of their mixing ratio.

[Production of Cathode]

A metal foil being the material of the above-mentioned cathode current collector 22b is punched into a desired shape to form the cathode current collector 22b. At this time, the cathode current collector 22b and the cathode terminal 26 are formed into one unit, similarly to the case of the anode current collector 21b.

The cathode active material layers are composed by containing, e.g., the cathode active material, and the conductive agent and the binding agent if necessary. They are mixed homogeneously into a cathode mixture, and this cathode mixture is dispersed into a solvent to be made slurry. Then, this slurry is applied evenly over the cathode current collector 22b by the doctor blade method or the like, and thereafter dried at a high temperature to remove the solvent. The cathode active material layers 22a are thus formed. Here, the cathode active material, the conductive agent, and the binding agent may be mixed at any ratio, similarly to the case of the anode active material layers.

[Fabrication of Battery Element]

Next, the battery element 20 is fabricated by stacking the anodes 21, the cathodes 22, and the separators 23. A stacking process is shown in FIGS. 12A through 12L, in which the construction of the sucking apparatus 30 is shown only schematically and some reference numerals are omitted.

First, the cathode 22 is sucked by the electrode sucking block 31 (FIG. 12A). Then, the sucking apparatus 30 is lowered by the elevating cylinder (not shown) to insert the cathode 22 into the contour holder 35 (FIG. 12B), and thereafter elevated (FIG. 23C). Then, the anode 21 is sucked by the electrode sucking block 31, and the separator 23 is sucked by the separator sucking block 32 (FIG. 12D). The sucking apparatus 30 is lowered to stack the separator 23 and the anode 21 on the cathode 22 at the same time (FIG. 23E). At this time, an edge portion of the separator 23 is raised by the contour holder 35.

Subsequently, the sucking apparatus 30 is elevated (FIG. 12F), and the cathode 22 is sucked by the electrode sucking block 31 and the separator 23 is sucked by the separator sucking block 32 (FIG. 12G). Then, the sucking apparatus 30 is lowered to stack the separator 23 and the cathode 22 at the same time (FIG. 12H). At this time, an edge portion of the separator 23 stacked together with the cathode 22 is raised by the contour holder 35, and overlap with the raised edge portion of the separator 23 stacked together with the anode 21, along an edge portion of the cathode 22, at each side. After elevating the sucking apparatus 30 again (FIG. 12I), the steps of FIGS. 12D through 12I are repeated until a desired stacked electrode body is formed. It is noted that the lamination process is performed such that the anode terminals 25 overlap one another and the cathode terminals 26 overlap one another.

Furthermore, after stacking a cathode 22 being the uppermost electrode layer, the adhesive tape 24 is adhered to both sides and the bottom at the recesses 34 of the electrode sucking block 31 (not shown) to which the electrodes are exposed, while keeping the sucking apparatus 30 pressing the stacked electrodes, to hold and fix the stacked electrodes (FIG. 12J). Finally, the sucking apparatus 30 is elevated (FIG. 12K), and the stacked electrodes are taken out of the contour holder 35 to form the stacked electrode body. By collectively connecting the plurality of anode terminals 25 respectively one-unit with the anodes 21 and by collectively connecting the plurality of cathode terminals 25 respectively one-unit with the cathodes 22, of the stacked electrode body, whereby the battery element 20 is formed.

When the separator 23 is sucked, not only a suction by the vacuuming by the separator sucking block 32, but also static electricity build up between the electrode and the separator 23, and thus stable suction can be performed.

Furthermore, if possible, an electrode and a separator 23 that are stacked together beforehand may be sucked by the electrode sucking block 31 and the separator sucking block 32 together.

[Production of Stacked Nonaqueous Electrolyte Battery]

The battery element 20 produced as described above is housed in the container portion 27a of the laminate film 27 formed by deep-drawing, as shown in FIG. 6B. The laminate film 27 is folded such that an opening of the container portion 27a is covered, and then two sides of the periphery of the container portion 27a are welded, e.g., by heat or the like. Subsequently, the container portion 27a is filled with the electrolytic solution through one side that is not welded yet, and this side is thereafter sealed by thermal welding, thereby manufacturing the stacked nonaqueous electrolyte battery 10 shown in FIG. 6A. The laminate film 27 may be of a folded type such as shown in FIG. 6B, or two laminate film 27 sheets may be used to sandwich the battery element 20 from above and below.

Figure 13A:
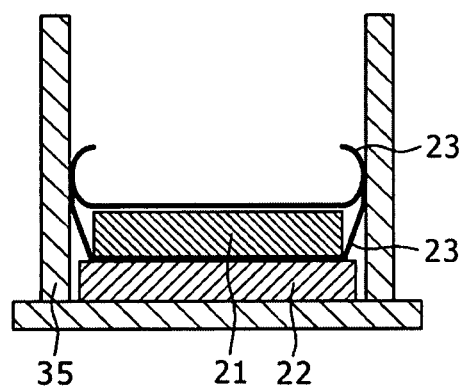
FIGS. 13A and 13B are schematic diagrams showing how an electrode and a separator are placed when the electrode and the separator are inserted separately.
Figure 13B:
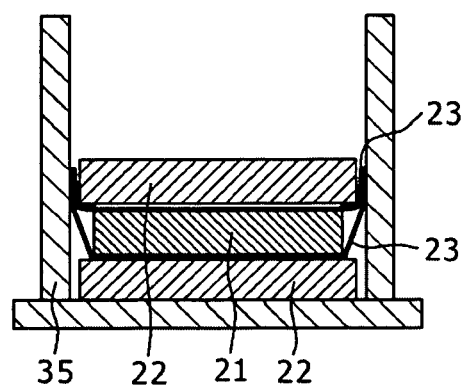

If an electrode and a separator are inserted separately from each other, the separator 23 is not raised properly as shown in FIG. 13A, and this causes a cathode 22 inserted next to step on an edge portion of the separator 23 as shown in FIG. 13B, preventing plural separators 23 from overlapping along each electrode edge portion. If the sucking apparatus 30 is used, an electrode and a separator 23 are stacked together, so that the separator 23 is raised properly, thereby allowing the stacked nonaqueous electrolyte battery 10 according to the embodiment to be produced.

In the stacked nonaqueous electrolyte battery produced as described above, each edge portion of a separator is raised, and a plurality of separators overlap along each edge portion of an electrode, thereby preventing the electrode from deviating from its proper position, and preventing short-circuits and failures of proper battery reactions due to the entrance of foreign matter between the electrode and the separator, and further enhancing the battery quality.

In addition, compared with a spirally wound stacked type battery commonly used and the like, it is possible to reduce the amount of separators used, and to enhance the volumetric efficiency and to reduce the production cost since an expensive separator folding apparatus and the like are not needed.

Furthermore, the electrodes and the separators may be stacked by a simple process with a reduced number of steps, thereby enhancing the productivity.

EXAMPLES

Using the above-described stacked nonaqueous electrolyte battery, the resistance to vibrations was examined. In the following examples, a battery element such as shown in FIGS. 7A and 7B was produced by preparing the anodes and the cathodes shown in FIG. 8, and thereafter stacking them together with the separators.

Example 1

Production of Anode

An anode mixture was prepared by homogeneously mixing 92 wt/% of lithium cobaltate ($LiCoO_2$), 3 wt % of powdered polyvinylidene fluoride, and 5 wt % of powdered graphite, and this mixture was dispersed into N-methyl-2-pyrrolidone (NMP) to make an anode mixture slurry. This anode mixture slurry was applied evenly over both surfaces of an aluminum (Al) foil which will become an anode current collector, vacuum-dried at 100° C. for 24 hours, and thereafter pressure-formed by a roll pressing apparatus, thereby forming anode active material layers.

[Production of Cathode]

A cathode mixture was prepared by homogeneously mixing 91 wt % of artificial graphite and 9 wt % of powdered polyvinylidene fluoride, and this mixture was dispersed into N-methyl-2-pyrrolidone (NMP) to make a cathode mixture slurry. This cathode mixture slurry was applied evenly over both surfaces of a copper (Cu) foil which will become a cathode current collector, and vacuum-dried at 120° C. for 24 hours, and thereafter pressure-formed by the roll pressing apparatus, thereby forming cathode active material layers. It is noted that the cathode was formed 2 mm larger in outer dimensions than the anode.

[Preparation of Electrolytic Solution]

An electrolytic solution was prepared by dissolving 0.8 mol/kg of $LiPF_6$ and 0.2 mol/kg of $LiBF_4$ in a solvent of ethylenecarbonate (EC) and propylenecarbonate (PC) mixed at a weight ratio of 6:4.

[Fabrication of Battery Element]

Using the stacking apparatus shown in FIGS. 11A and 11B, the anodes, the cathodes, and the separators were stacked. They were stacked in order of a first layer of cathode, a separator, a first layer of anode, a separator, a second layer of cathode, a separator, a second layer of anode . . . a fifteenth layer of cathode, a separator, a fifteenth layer of anode, a separator, a sixteenth layer of cathode, and a resultant laminate is fixed by an adhesive tape. The anode and the cathode were stacked such that a clearance of 1 mm was provided between their edge portions on each side. Also, between the cathode edge portions and the inside dimensions of the contour holder, their clearance was set to 0.1 mm.

Example 2

Figure 14A:
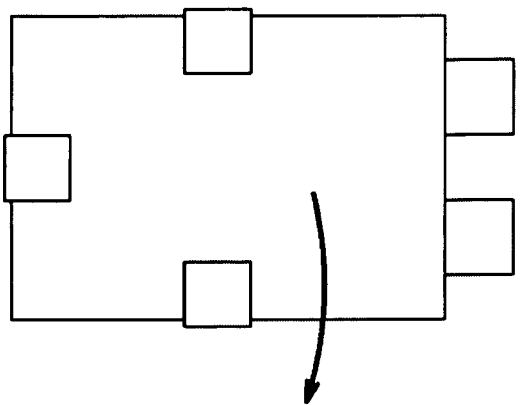
FIGS. 14A and 14B are schematic diagrams for illustrating directions in which vibrations are applied after stacking.
Figure 14B:
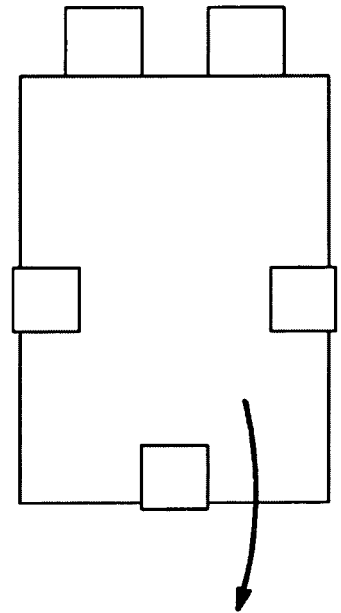

After stacking anodes, cathodes, and separators, and fixing a stacked resultant, the stacked resultant were shaken in its laid-down position and in its erect position, five times each, with a hand, as shown in FIG. 14. A battery element was fabricated similarly to the case of Example 1 except that the vibrations were applied after the stacking.

Example 3

After stacking a first cathode to a thirteenth cathode, the stacking apparatus were hold in hands, and elevated and lowered during stacking a thirteenth anode to a sixteenth cathode. Other than the above operation, a battery element was fabricated similarly to the case of Example 1. It is noted that "during stacking" means a period in which the sucking apparatus sucks electrodes and separators, and lowers to their stacking position.

Figure 15:
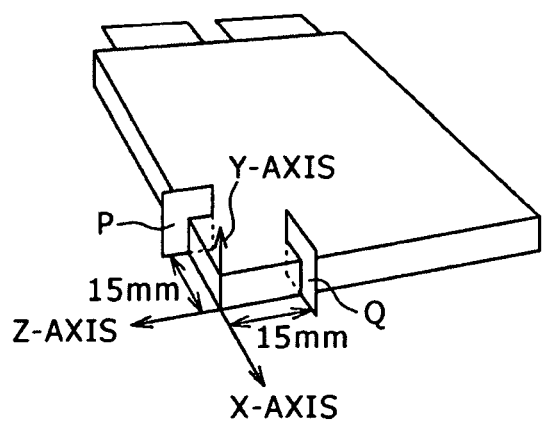
FIG. 15 is a schematic diagram for illustrating plane sections for observation through CT.

The respective examples of the battery elements thus fabricated, X-ray CT (Computed Tomography) images are taken, of a plane section denoted P across an X-axis along one battery element side portion and a plane section denoted Q across a Z-axis along a battery element bottom portion, as shown in FIG. 15. It is noted that the plane section is taken at a position 15 mm from one of the corners of the bottom portion, in each of the side and the bottom portions, and that these plane sections are to be observed.

In the CT images of stacked plane sections at the side and the bottom portions, the following points were examined.

(a) Maximum Deviation of Cathode Foil

Of the first to sixteenth cathodes, two cathodes were selected in which a distance between their edge portions is largest, and the distance was analyzed. In the cathodes, it is noted that the maximum deviation was analyzed by considering edge portions of their cathode current collectors formed from Cu as edge portion positions of the cathodes, since the cathode active material layers cannot be observed through the CT images.

(b) Maximum Deviation of Anode Foil

Of the first to fifteenth anodes, two anodes were selected in which a distance between their edge portions is largest, and the distance was analyzed. In the anodes, it is noted that the maximum deviation was analyzed by considering edge portions of the anode active material layers as edge portion positions of the anodes, since the anode current collectors formed from the Al foils cannot be observed through the CT images.

(c) Maximum Deviation Between Anode and Cathode Adjacent to Each Other

Of all pairs of an anode and a cathode that are adjacent to each other, a pair of an anode and a cathode was selected in which a distance between their edge portions is largest, and the distance was analyzed. By the "anode and cathode that are adjacent to each other", it is intended to mean any pair consisting of, e.g., the tenth cathode and the tenth anode, or the tenth anode and the eleventh cathode. When the distance equals 1 mm, it is considered as "no deviation" since a clearance of 1 mm is provided between the anode and the cathode. Furthermore, the maximum deviation was analyzed by considering edge portions of the anode active material layers as edge portion positions of the anodes and edge portions of the cathode current collectors formed from Cu as edge portion positions of the cathodes since, as mentioned above, the anode current collectors formed from the Al foils and the cathode active material layers cannot be observed through the CT images.

Results of the analyses are shown in the following table 1.

TABLE 1

| | STACKED PLANE SECTION P AT SIDE (SECTION ACROSS X-AXIS) | | | STACKED PLANE SECTION Q AT BOTTOM (SECTION ACROSS Z-AXIS) | | |
|---|---|---|---|---|---|---|
| | (a) MAXIMUM DEVIATION CATHODE FOIL [mm] | (b) MAXIMUM DEVIATION ANODE FOIL [mm] | (c) MAXIMUM DEVIATION ADJACENT ANODE/CATHODE [mm] | (a) MAXIMUM DEVIATION CATHODE FOIL [mm] | (b) MAXIMUM DEVIATION ANODE FOIL [mm] | (c) MAXIMUM DEVIATION ADJACENT ANODE/CATHODE [mm] |
| EXAMPLE 1 | 0.2 | 0.1 | 0.2 | 0.1 | 0.3 | 0.1 |
| EXAMPLE 2 | 0.2 | 0.2 | 0.1 | 0.2 | 0.3 | 0.1 |
| EXAMPLE 3 | 0.2 | 0.1 | 0.1 | 0.2 | 0.3 | 0.1 |

Compared with the battery element according to Example 1 to which no vibration was applied, the battery elements according to Examples 2 and 3 to which vibrations were applied after or during lamination exhibited substantially equal deviations in their electrodes. Furthermore, since the clearance between the cathode edge portion and the contour holder is 0.1 mm and the clearance between the anode edge portion and the cathode edge portion is 1 mm, it is understood that in the battery elements fabricated as embodiments, the anodes were not extended from the cathode edge portions even when vibrations were applied to the battery elements after or during stacking the electrodes, thereby preventing short-circuits and the like.

According to an embodiments, a fixing member is provided such that the separator is raised and the plurality of raised separators overlap one another along an edge portion of the anode or cathode, so that it is possible to prevent the electrode from deviating from its proper position, and to prevent the entrance of foreign matter from an edge portion of the stacked body.

Furthermore, in an embodiment, neither a sealing apparatus nor a special folding apparatus are needed for the separators, so that it is possible to produce the stacked nonaqueous electrolyte battery in a simple process.

According to an embodiment, a stacked nonaqueous electrolyte battery which can be produced in a simple process and which has superior battery quality and performance, can be provided, along with a production method and a stacking apparatus therefor.

According to an embodiment, the values referred to in the above-described embodiments are merely one example, and thus different values may be used when necessary.

Furthermore, this stacked nonaqueous electrolyte battery may be used as either a primary battery or a secondary battery, and may be packaged not only in a laminate film but also in a battery can.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A stacked nonaqueous electrolyte battery comprising:
a plurality of anodes and cathodes alternately stacked and isolated by separators, the separators including at least one adjacent pair of first and second separators,
wherein each separator has raised edge portions at each side of one of the anodes and cathodes, the first separator including first raised edge portions comprising a first portion raised from the first separator at a first angle and a second portion raised from the first portion at a second angle, both the first and second angles being less than about 90 degrees, and the second separator including second raised edge portions raised from the second separator at about 90 degrees,
wherein a stacked electrode body composed of the plurality of anodes and cathodes isolated by the separators is fixed in a stacked state by a fixing member provided on at least one side of the electrode body,
wherein each separator has a length greater than each of the anodes and cathodes such that the first and second raised edge portions of the at least one adjacent pair of separators overlap along an edge portion at each side of one of the anodes and cathodes, and
wherein each separator has a thickness of 5 μm to 50 μm and comprises a porous film.

2. The stacked nonaqueous electrolyte battery according to claim 1, wherein the cathode includes a cathode current collector having a width and length larger than that of an anode current collector, and cathode active material layers formed on both surfaces of the cathode current collector.

3. The stacked nonaqueous electrolyte battery according to claim 1, wherein the fixing member is provided at three sides which are electrode side portions excluding a leading side from which an anode terminal and a cathode terminal are led, and an electrode bottom portion opposite to the leading side of electrode.

4. The stacked nonaqueous electrolyte battery according to claim 1, wherein the fixing member is an adhesive tape.

5. The stacked nonaqueous electrolyte battery according to claim 1, wherein the stacked electrode body is housed in a moisture-resistant laminate film having a laminated structure.

6. The stacked nonaqueous electrolyte battery according to claim 5, wherein the laminate film comprises an adhesive layer, a metal layer and a surface protection layer laminated successively.

7. The stacked nonaqueous electrolyte battery according to claim 1, comprising: a plurality of anode current collectors; a plurality of cathode current collectors; a plurality of anode terminals; and a plurality of cathode terminals,
wherein the anode terminals overlap one another and the cathode terminals overlap one another.

8. The stacked nonaqueous electrolyte battery according to claim 7, wherein the plurality of anode terminals are collectively connected to the plurality of anodes and the plurality of cathode terminals are collectively connected to the plurality of cathodes.

9. The stacked nonaqueous electrolyte battery according to claim 1, wherein the overlapping edge portions of the separators are formed by vacuum suctioning one of the separators and at least one of the anodes and cathodes and inserting the separator together with the at least one of the anodes and cathodes into a contour holding member.

* * * * *